Figure 1:
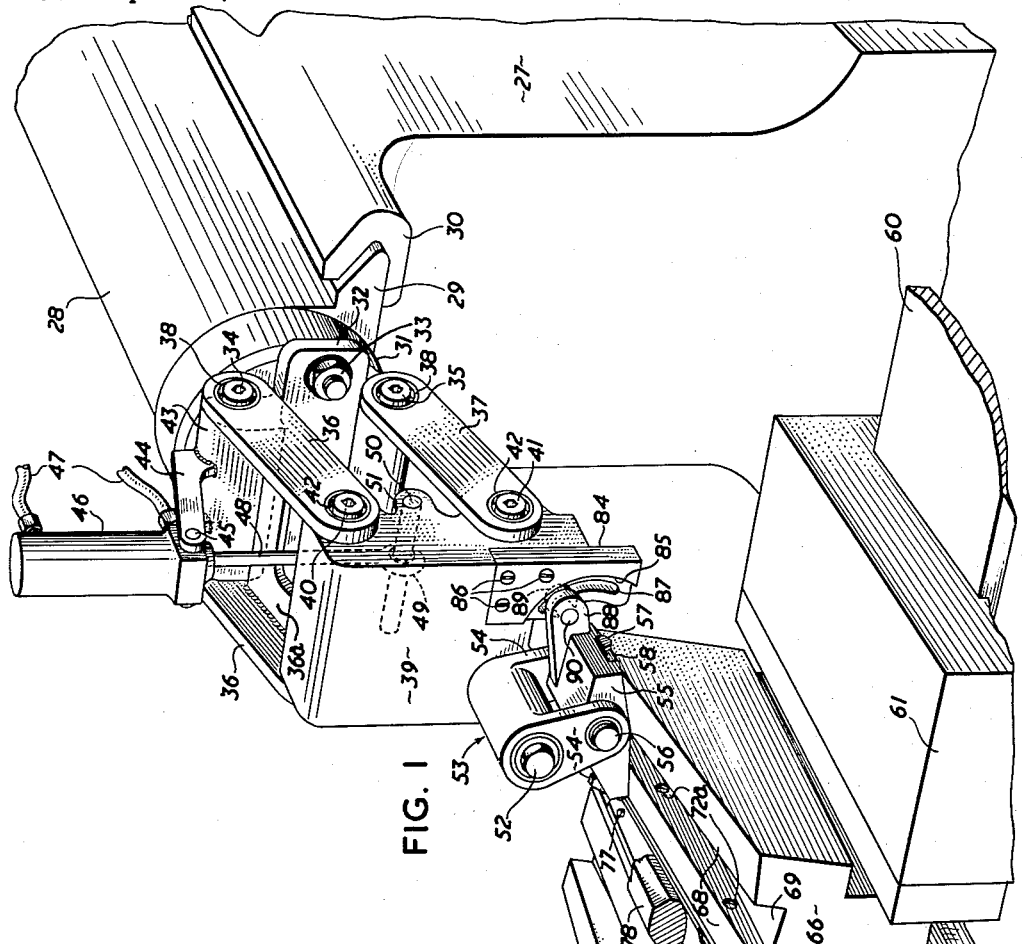

Dec. 27, 1960  J. O. CREEK  2,966,097
MACHINE TOOLS
Filed April 29, 1959  4 Sheets-Sheet 1

INVENTOR
J. O. CREEK

BY: *Maybee & Legris*
*ATTORNEYS*

Dec. 27, 1960 J. O. CREEK 2,966,097
MACHINE TOOLS
Filed April 29, 1959 4 Sheets-Sheet 2
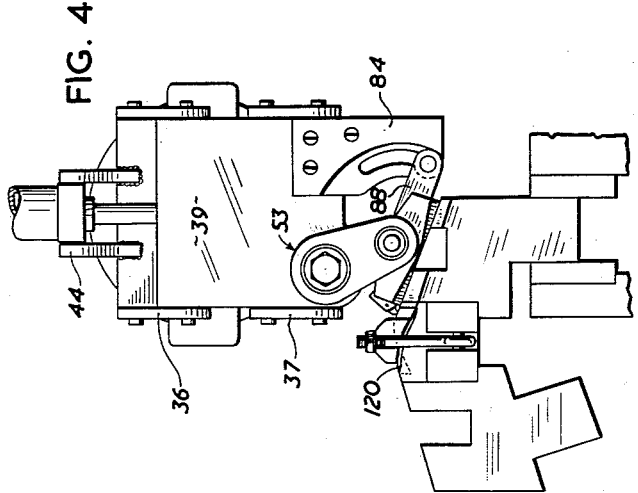
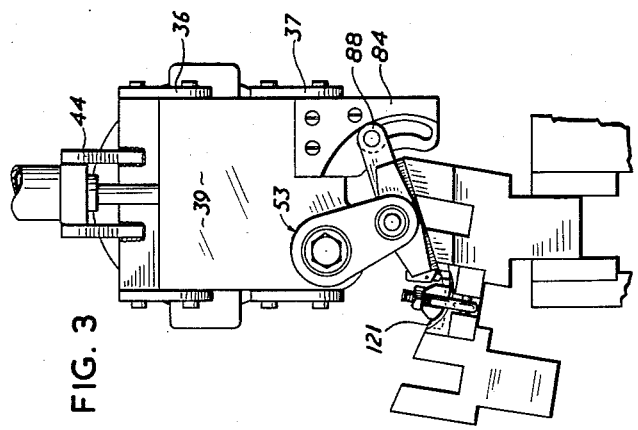
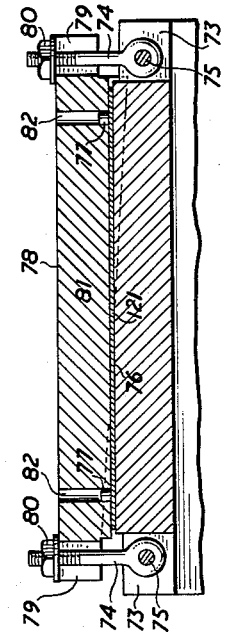
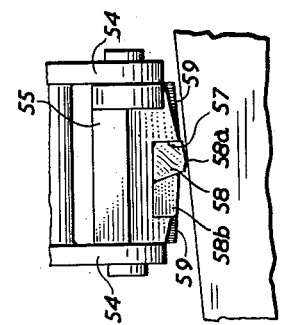
INVENTOR
J. O. CREEK
BY: *Maybee & Legris*
ATTORNEYS Dec. 27, 1960    J. O. CREEK    2,966,097
MACHINE TOOLS Filed April 29, 1959    4 Sheets-Sheet 3

INVENTOR
J. O. CREEK

BY: *Maybee & Legris*
ATTORNEYS

Dec. 27, 1960    J. O. CREEK    2,966,097
MACHINE TOOLS
Filed April 29, 1959    4 Sheets-Sheet 4

INVENTOR
J. O. CREEK

BY: Maybee & Legris
ATTORNEYS

United States Patent Office 2,966,097
Patented Dec. 27, 1960

2,966,097

MACHINE TOOLS

John Oliver Creek, Brampton, Ontario, Canada, assignor to Orenda Engines Limited, Malton, Ontario, Canada, a corporation Filed Apr. 29, 1959, Ser. No. 809,670

6 Claims. (Cl. 90—13)

This invention relates to machine tools for producing continuous, non-planar surfaces on a work-piece, the surfaces produced being definable by a multiplicity of straight lines in adjacent parallel planes. More particularly, the machine tool of the invention is arranged to cut a continuous, non-planar surface on the edge of a work-piece, particularly along the leading or trailing edge of a sheet metal skin of a blade of aerofoil section, e.g. of a blade for a turbine or compressor of a gas turbine engine.

As is well known, gas turbine engines include bladed rotors for compressors and turbines and various constructions of blades have been proposed for use in such rotors. Some blades are hollow, some blades are solid, some are cast and some are made from sheet metal. A construction of blade in connection with which the present invention is of value, is a construction wherein the blade has upper and lower sheet metal blade skins, each skin having joint surfaces along its leading and trailing edges which mate with corresponding joint surfaces along the leading and trailing edges of the other skin. Often such blades are twisted, that is to say that their longitudinal, or radial, axis is not a straight line, and difficulties have been encountered in machining the joint surfaces on the leading and trailing edges of the skins of such blades. The surfaces are in the form, generally speaking, of a flat strip bent to follow a roughly helical path. However, the helix is not regular and thus conventional methods of machining a helix are not of use.

The joint surfaces of skins of such blades can be cut by using a shaper tool having a three dimensional tracer mechanism, the cutting tool of the shaper being constrained to follow, by remote control, the movements in three dimensions of a tracer which is caused to move over a master profile of the surface to be cut. However, shapers having such a three dimensional tracing system are very expensive and are also specialized tools so that, in many circumstances, the capital monies tied up in their purchase may not be used to the full advantage.

It is therefore an object of the present invention to provide a machine tool which will cut a non-planar surface defined by a multiplicity of straight lines in adjacent parallel planes and which may have, as a basis, a conventional shaping or milling machine.

Another object of the invention, is to provide a machine tool which will produce a continuous, non-planar surface defined by a multiplicity of straight lines in adjacent parallel planes on a workpiece without the necessity of providing remotely controlled three dimensional tracer and follower mechanisms.

A further object of the invention is to produce a machine which will cut the joint surfaces on the leading and trailing edges of a sheet metal skin of a twisted blade of aerofoil section.

A still further object of the invention is to provide an attachment which may be readily attached to, and detached from, certain traversing machine tools such as shapers and milling machines.

In the specification and claims, the term "blade of aerofoil section" is used to include compressor blades, turbine blades, propeller blades and similar blades.

Figure 2:
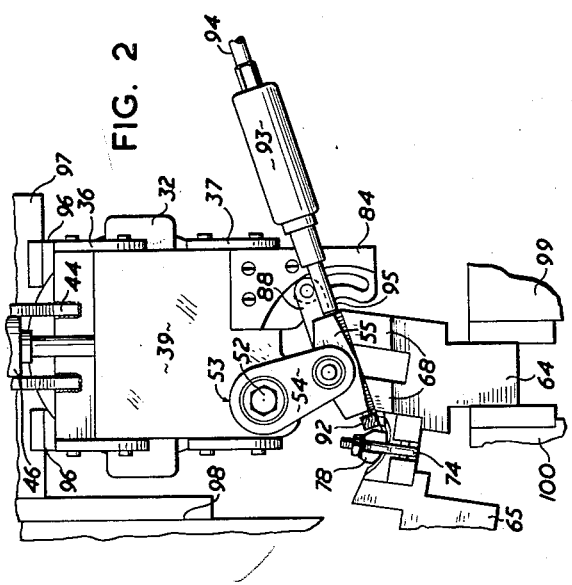
Figure 7:
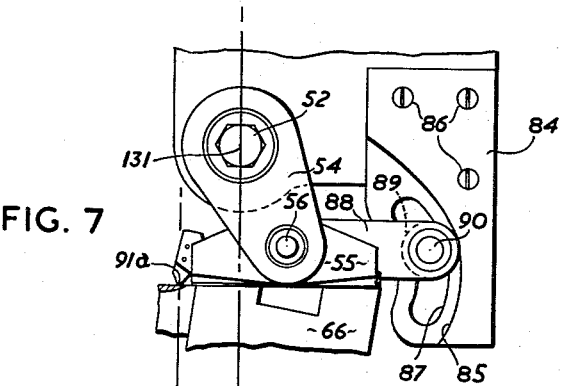
Figure 8:
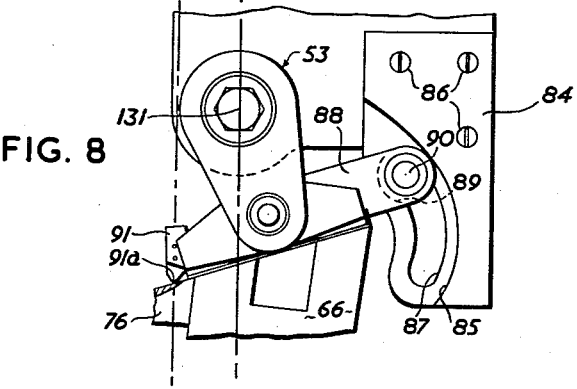
Figure 9:
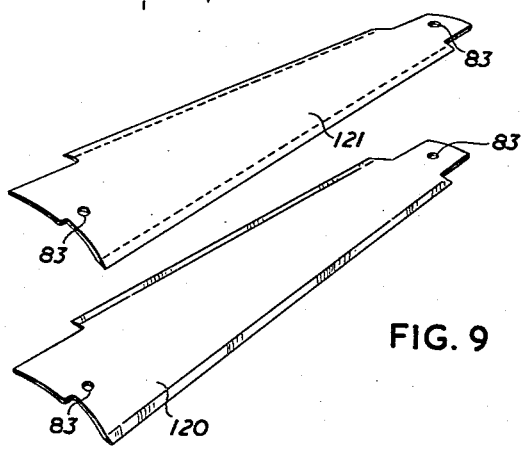
Figure 10:
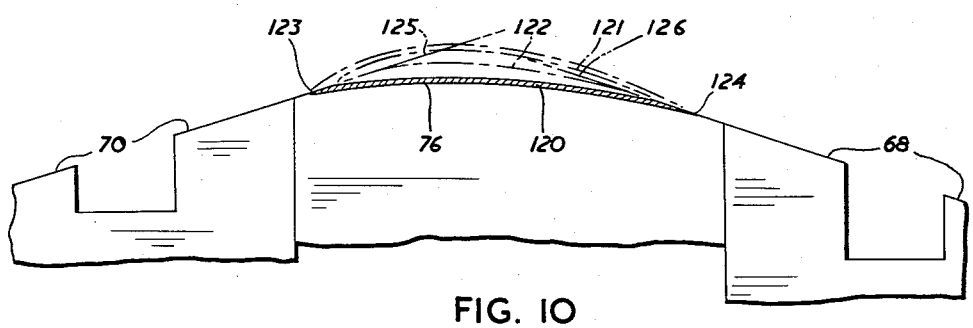
Figure 11:
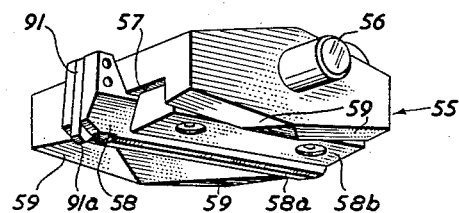

The invention will now be described by way of example with reference to the accompanying drawings, in which like reference numerals indicate similar parts throughout the various views, and in which:

Figure 1 is a perspective view of the working part of a machine tool according to the invention, Figure 2 is an end elevation of a second embodiment of a tool according to the invention, Figure 3 is an end elevation of the machine of Figure 1 illustrating the machining of one edge of a blade skin, Figure 4 is a view similar to Figure 3 showing the machining of an edge of the other skin of the blade, Figure 5 is an end elevation of the cutting head showing how the tool engages the master surface, Figure 6 is a longitudinal section through the means provided to mount a blade skin on the base of the machine, Figures 7 and 8 show the orientation of the cutting head at different points during its cutting stroke, Figure 9 shows the upper and lower blade skins after the joint surfaces have been formed and before assembly, Figure 10 is a diagram showing the respective orientations of the joint surfaces on the blade skin, the camber line of the blade section and the guide surfaces, and Figure 11 is a detail, perspective view of the tool holder and tool.

In the construction of hollow blades of aerofoil section from upper and lower sheet metal skins, it will be apparent that the strength of the blade will depend to a great extent upon the strength of the joints between the skins. It will also be appreciated that, for ease of assembly, it is desirable to make each joint surface lie along a straight line when viewed in a section transverse to the longitudinal axis of the blade. In these circumstances, each joint surface can be considered to be defined by a multiplicity of straight lines in adjacent parallel planes, the planes being transverse to the longitudinal axis of the blade so that, at any section defined by one of the transverse planes, the joint surface along either the leading or the trailing edge will be a straight line. It will be appreciated, however, that the orientations of the straight lines relative to the longitudinal axis of the blade will vary from one plane to another. In practice, with a twisted blade, the joint surface will somewhat resemble the surface of a flat strip which has been bent into a generally helical form while keeping the surface of the strip rectilinear when viewed at any transverse cross-section.

The cutting of such a generally helical surface presents difficulties since the surface is not regular and it has not heretofore been possible mechanically to cut such surfaces without three dimensional hydraulic tracer mechanisms which operate by remote control and which are very expensive.

The present invention provides relatively simple mechanism for cutting such a surface and utilizes a master guide surface, from which the joint surface is to be cut. As will be seen hereinafter, the master surface is also defined by a multiplicity of straight lines in adjacent parallel planes and the planes containing the lines defining the master guide surface are parallel to the planes containing the lines defining the joint surface.

Referring now to Figure 1, the machine tool comprises basically a shaper tool having a supporting column 27, and an arm 28 mounted in the column 27 and having longitudinal ribs 29 slidable in guideways 30 on the column. The arm 28 is reciprocable by conventional actuating means (not shown) used in shaper machines.

The arm 28 has a face plate 31 to which is bolted a mounting member 32, the mounting member being retained in position by nut and washer assemblies 33. The mounting member carries upper and lower pivot axes 34 and 35. Two pairs of parallel links are pivoted on the axes 34 and 35, the links of the upper pair being indicated at 36 and one of the links of the lower pair being indicated at 37. The links are supported at their ends on the pivot axes 34, 35 by roller bearings 38 and the links 36 are inter-connected by an apertured web 36a.

The other ends of the parallel links are pivotally attached to a thrust member or thrust plate 39 which has upper and lower pivot axes 40 and 41 on which the links 36, 37 are pivotally mounted; roller bearings 42 being interposed between the links and the axes 40 and 41.

The mounting member 32 has an upward extension 43 which carries a pair of forwardly extending arms, one of which is indicated at 44. Pivoted between the free ends of the arms 44 at 45 is the cylinder 46 of a hydraulic jack which is supplied with operating fluid through pipes 47. The piston rod of the jack, indicated at 48, is provided at its free end with an eye 49 which embraces a bar 50 supported from the thrust member 39 by trunnions 51.

Pivotally mounted about an axle 52 on the front surface of the thrust member is a double armed link 53 having arms 54 between which is pivotally mounted a tool holder indicated generally at 55. The tool holder, shown in detail in Figure 11, is formed with a pair of outwardly directed projections, one of which is indicated at 56 and which are pivotally received in apertures in the free ends of the arms 54. Mounted in a slideway 57 on the underside of the tool holder is the shank of a tool 58 whose underside is chamfered as best seen in Figure 5 to provide a substantially linear contact surface 58a. The tool is retained in position in the slideway by a wedge block 58b. The underside of the tool holder 55 is relieved at 59 at each of the four corners of its under surface.

Returning now to Figure 1, the bed of the machine tool is indicated generally at 60 and includes a pair of movable vice jaws 61 and 62. Gripped between the vice jaws 61 and 62 is a base generaly indicated at 63 which holds the work-piece and provides the master surfaces from which the surfaces on the work-piece are cut. The base is provided with two gripping spigots, one of which is indicated at 64 as gripped between the vice jaws 61, 62 and the other of which is indicated at 65. Above each gripping spigot there is formed a contour master, one master being indicated generally at 66 and the other at 67. Each contour master has a guide surface which is formed in two spaced apart portions, thus the guide surface of the contour master 66 is indicated at 68, and is formed in two parts separated by a slot 69. Similarly, the guide surface of the contour master 67 comprises two portions 70 separated by a slot 71.

On the base, and between the guide surfaces 68 and 70, there is provided means for mounting the blade skin whose edges are to be machined; the mounting means including a block 72 having a slot 73 at each end thereof, the block being retained between the contour masters by bolts 72a. Referring now to Figure 6, it will be seen that pivotally mounted in each slot 73 is an eye bolt 74, the eye of which embraces a pin 75 spanning the slot 73. The block 72 is provided with a bed 76 which is contoured to receive the blade skin and has upstanding therefrom two projections 77. Co-operating with the bed 76 to clamp the blade skin thereon is a retaining block 78 which is slotted at its ends 79 to receive the eye bolts 74 which carry nut and washer assemblies 80. The undersurface 81 of the retaining block 78 is contoured to be complementary to the blade skin and apertures 82 are provided to receive the projections 77.

Each of the upper and lower blade skin blanks, indicated in Figure 9 at 120, 121, is provided with apertures 83 which engage the projections 77 on the bed 76.

The apertures 83 are formed in portions of the blanks which are removed during assembly of the blade. A blade skin is mounted on the bed 76 by slackening off the nuts 80, swinging the eye bolts 74 about their pivot pins 75, lifting the retaining block 78, placing the blade skin in position on the bed 76 with the apertures 83 embracing the pins 75, replacing the block 78, pivoting the eye bolts so that the nut and washer assemblies are above the upper surface of the retaining block 78 and then tightening down the nuts to grip the blade skin between the block 78 and the bed 76 and retain it in position on the bed.

Turning now to relationship between the master surfaces and the surfaces to be cut, it is a feature of the preferred forms of the invention that the guide surface of the master is "congruent" with the joint surface to be cut on the work-piece. By "congruent" is meant that both surfaces are formed in the same manner so that if placed together side-by-side they form an extension one of the other and the total extended surface may be considered to be defined by a plurality of straight lines in adjacent parallel planes.

An example will probably clarify the above discussion. As an example, a twisted blade of aerofoil section having upper and lower sheet metal skins has the joint surfaces along the leading and trailing edges of the blades between the blade skins each defined by a plurality of straight lines in adjacent parallel planes normal to the longitudinal axis of the blade. Each of the lines defining a joint surface is a tangent to the camber line of the blade at the intersection of the camber line and the leading or trailing edge of the blade as the case may be. The camber line of an aerofoil section is a line, each point of which is equidistant from the upper and lower boundaries of the aerofoil section, the distances being measured normal to the line itself. The camber line of the section of a twisted blade is a curve joining the leading and trailing edges of the blade at the section.

The master guide surface for cutting such a joint surface could theoretically be formed by placing a metal block alongside the desired joint surface and shaping the surface of the block until the tangents to the camber lines which define the joint surface also lie across the guide surface in contact therewith and therefore define the guide surface. Each surface would then be an extension of the other and a straight edge sweeping along the guide surface, and extended over the work-piece, would sweep out the joint surface. This arrangement has the advantage that only a single surface need be initially developed, the developed surface serving as both the surface to be cut and also the guide surface.

Where the joint surface and the guide surface are true extensions one of the other, as above described, the cutting portion of the tool and the points on the tool holder or follower which engage the guide surface will lie in a plane.

Wherever the term "congruent" is used in the following specification and claims it has the meaning described above.

Referring now to Figure 10, there is shown a lower blade skin 120 laid in position on the bed 76 with the master surfaces 68 and 70 adjacent to the edges of the skin. The upper blade skin is indicated in phantom lines at 121, and the camber line is indicated at 122 while 123 indicates generally the leading edge of the blade and 124 the trailing edge thereof. The joint surfaces between the skins 120 and 121 lie on the tangent lines 125, 126 to the camber line 122 at the leading and trailing edges of the blade. At any transverse section of the blade, the joint surface of the leading edge of the blade lies along a straight line which is a tangent to the camber line of the section at the intersection of the camber line with the leading edge. Similarly, the joint face at the trailing edge at any transverse section, appears as a tangent to the camber line of the section at the intersection of the trailing edge of the blade with the camber line of the section. It follows that the joint surfaces on the blade skins at the leading and trailing edges may each be considered to be defined by a multiplicity of straight lines in adjacent parallel planes, each line being a tangent to the camber line of the section at the intersection of the camber line with the leading or trailing edge as the case may be.

Similarly, the master surfaces employed in the forming of the joint surfaces are themselves composed of a plurality of straight lines in adjacent parallel planes. The guide surfaces are preferably congruent with the joint surfaces as shown in Figure 10 so that, at any section, a straight edge can be laid across one of the joint surfaces and its corresponding guide surface. Thus in Figure 10 the straight lines 125 and 126 define both the joint surfaces and the guide surfaces 68 and 70.

Referring now to Figures 1, 7 and 8, the front surface of the thrust member is provided with a cam member 84 having a cam surface 85. The cam member 84 is retained in position on the thrust member by bolts 86, and is slotted at 87. An arm 88 is mounted on the tool holder 55 and carries a roller 89 which engages with the cam track 85; the roller 89 being mounted on a pin 90 mounted in the arm 88, the other end of the pin being guided in the slot 87.

Referring now to Figures 7, 8 and 11, the tool 58 has a tool bit 91 having a cutting portion 91a which engages the work-piece and cuts the desired surface. Preferably the cutting portion has a point cutting surface and conventional cutting tools may be used. The configuration of the cam surface 85 and the lengths of the arms 54 and 88 are such that, as the tool holder 55 is moved in contact with a master surface and is caused to rock, the cutting portion 91a of the tool 91 remains substantially in the same vertical plane. Thus the cutting portion 91a in Figure 7 is in the same vertical plane, indicated at A, as is the cutting portion 91a shown in Figure 8. From a more general point of view, the cutting portion 91a of the tool remains in a plane, indicated at A, parallel to the plane, indicated at B in Figures 7 and 8, containing the locus of a fixed point on the thrust member 39 as the latter is traversed and moves towards and away from the base. The point indicated at 131 in Figures 7 and 8 as the fixed point on the thrust member is the axis of the axle 52 but any convenient point may be taken. It is apparent that in the embodiment shown plane B is vertical. This arrangement has advantages which will hereinafter be described.

Referring now to Figure 2, the arrangement therein shown is similar to that shown in Figure 1 except that a milling machine is the basis of the tool and a milling cutter is used instead of a point cutting tool as in Figure 1. Parts which are identical in Figures 1 and 2 are denoted by the same reference numerals. The milling cutter is indicated at 92 and is driven by a compressed air motor 93 supplied with compressed air from a source, not shown, through a pipe 94. The shank 95 of the milling cutter is received in the tool holder 55 which in this instance has its undersurface relieved so as to make substantially linear contact with the guide surface 68. The mounting member 32 is provided with jaws 96 which grip the arbor 97 of a milling machine having a main column 98. The spigot 64 of the base is gripped between vice jaws 99 and 100 on the bed of the machine.

As will be seen from Figures 9 and 10, the upper and lower blade skins are of different cross-sectional configurations and therefore each requires a separate base, bed and master surfaces. Thus the base and bed for the upper skin 121 is shown in Figures 1 and 3, while the base and bed for the lower skin 120 is shown in Figures 4 and 10. The bases and bed are of similar construction but are varied in dimensions and configurations to suit the blade skin to be worked on.

The operation of the embodiment shown in Figure 1 is as follows. The required base, depending on whether the upper or lower skin is to be machined, is set up between the vice jaws 61 and 62 of the machine and a blank, having the general form shown in Figure 9 for the blade skin, is mounted on the bed as hereinbefore described. During this initial part of the procedure, the thrust member 39 and its associated tool holder 55 are lifted away from the base by means of the hydraulic jack 46, 48. When the blade skin has been mounted and clamped in position on the bed 76, the thrust member 39 is lowered by means of the jack 46, 48 until the follower surface 58a of the tool 58 is in contact with the guide surface 68. A predetermined downward pressure may then be applied by the hydraulic jack to maintain the tool in contact with the master surface 68.

The arm 28 is now reciprocated by conventional shaper contro's and the tool holder 55 will traverse the master surface 68 and will pivot and rise and fall under the influence of the guide surface 68. During this movement, the cutting portion 91a of the tool 91 will cut a straight line along the surface of the work. The work is orientated so that the planes containing the straight lines defining the joint surface and its corresponding master surface are normal to the directions of reciprocation of the arm 28, i.e. normal to the reciprocal components of velocity imparted to the thrust member 39 by the arm 28.

The cutting portion 91a of the tool 91 will cut a straight line because of the cam arrangement provided by the cam surface 85, the roller 89 and the arm 88 which keeps the cutting portion in a vertical plane. By this means it is possible for the cutting tool to cut a line very near to the clamping block 78. This is a feature of considerable importance since the blade skins are normally made of springy material and are difficult to hold rigidly during machining. The block 78 is dimensioned so that it substantially overlies the blade skin except for the edge joint surfaces to be cut and so holds the edges of the skin rigidly during machining since there is no substantial extent of the skin unclamped. The machine will function satisfactorily without the provision of this camming means but the line cut by the tool will be curved. The cutting of a curved line is not, in itself, undesirable but would necessitate that the clamping support for the blade skin will have to be set further away from its edge than it would otherwise have to be. This is undesirable because, as mentioned, the blade skins are made of springy material and it is desirable to support them as near to the portion being worked upon as possible.

When a line has been cut on the joint surface, the base is traversed in a direction normal to the reciprocation of the arm 28 to bring another portion of the surface to be worked under the cutting portion 91a of the tool. This transverse traverse continues until the whole joint surface has been cut. In some cases, it may be possible to cut the joint surface in one pass but normally several passes are required and, as mentioned above, the work is traversed under the cutting tool in such circumstances until the required width of surface has been cut.

When one edge of the blade skin in the base has been cut the base is removed from the vice and the second spigot 65 is placed in the vice so that the other edge of the blade skin may be cut. Similarly, when it is desired to cut the joint surfaces along the edges of the other blade skin then the second base is mounted in the vice and the surfaces cut as before.

The operation of the embodiment shown in Figure 2 is substantially the same as the embodiment shown in Figure 1. The milling cutter is rotated by its compressed air motor 93 and is traversed along the work by the normal mechanism of the milling machine. It is normally possible to cut the joint surface in one pass with a milling cutter but if more than one pass is required the work is traversed under the cutter until the desired width of surface has been cut.

It will be seen that the invention provides a relatively simple machine tool which is capable of cutting surfaces which heretofore could only be cut by means of expensive remote controlled hydraulic or pneumatic tracer mechanisms.

It will be understood that the form of the invention herewith shown and described is a preferred example and various modifications can be carried out without departing from the spirit of the invention or the scope of the appended claims.

What I claim as my invention is:

1. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master and in fixed relation thereto, a thrust member, means to impart to the member traverse components of velocity in directions normal to said planes, means mounting the member for movement towards and away from the base in directions normal to said components of velocity, a tool holder carried in pivotal mountings on the member for rocking movement about an axis parallel to said components of velocity, a cutting tool mounted in the tool holder and extending over the work-piece when the latter is mounted on the base, and follower means operatively connected to the tool to engage the guide surface on the master, the follower means being maintained in engagement with the guide surface during operation of the tool whereby the tool holder is rocked and the thrust member is moved towards and away from the base as the member is traversed to cause the cutting tool to cut the surface on the work-piece.

2. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master and in fixed relation thereto, a thrust member, means to impart to the member traverse components of velocity in directions normal to said planes, means mounting the member for movement toward and away from the base in directions normal to said components of velocity, a tool holder carried in pivotal mountings on the member for rocking movement about an axis parallel to said components of velocity, a cutting tool mounted in the tool-holder and extending over the work-piece when the latter is mounted on the base, follower means operatively connected to the tool to engage the guide surface on the master with substantially line contact along a line parallel to said planes, and means to maintain the follower means in engagement with the guide surface during operation of the tool whereby the tool-holder is rocked and the thrust member is moved towards and away from the base as the member is traversed to cause the cutting tool to cut the surface on the work-piece.

3. A machine tool, for producing a continuous, non-planar surface on a work-piece, comprising a base, a contour master mounted on the base and having a continuous, non-planar guide surface, each surface being defined by a multiplicity of straight lines in adjacent parallel planes, the planes containing the lines defining one surface being parallel to the planes containing the lines defining the other surface, mounting means on the base for holding the work-piece adjacent to the master and in fixed relation thereto, a mounting member, means to traverse the mounting member along a straight line path in directions normal to said planes, a thrust plate, parallel links pivotally secured to the mounting member and to the thrust plate to mount the latter for movement toward and away from the base in directions normal to the directions of traverse of the mounting member, a tool-holder carried in pivotal mountings on the thrust plate for rocking movement about an axis parallel to said straight line path, a cutting tool mounted in the tool-holder and extending over the work-piece when the latter is mounted on the base, and follower means operatively connected to the tool to engage the guide surface on the master, the follower means being maintained in engagement with the guide surface during operation of the tool whereby the tool-holder is rocked and the thrust plate is moved towards and away from the base as the mounting member is traversed to cause the cutting tool to cut the surface on the work-piece.

4. A machine tool, for producing a continuous, non-planar surface on the edge of a sheet metal work-piece, comprising a base, a contour master mounted on the base and having a continuous, non-planar guide surface, each surface being defined by a multiplicity of straight lines in adjacent parallel planes, the planes containing the lines defining one surface being parellel to the planes containing the lines defining the other surface, a bed on the base for mounting the work-piece with said edge adjacent to the master, a block to co-operate with the bed, means to releasably secure the block to the bed with the work-piece clamped therebetween in fixed relation thereto, a thrust member, means to impart to the thrust member traverse components of velocity in directions normal to said planes, means mounting the thrust member for movement toward and away from the base in directions normal to said components of velocity, a tool-holder carried in pivotal mountings on the thrust member for rocking movement about an axis parallel to said components of velocity, a cutting tool mounted in the member and extending over the edge of the work-piece when the latter is clamped in position on the bed, and follower means operatively connected to the tool to engage the guide surface on the master, the follower means being maintained in engagement with the guide surface during operation of the tool whereby the tool-holder is rocked and the thrust member is moved towards and away from the base as the member is traversed to cause the cutting tool to cut the surface on the work-piece.

5. A machine tool for producing a continuous, non-planar joint surface along one of the leading and trailing edges of a sheet metal skin of a twisted blade of aerofoil section having leading and trailing edges and a camber line joining the leading and trailing edges at each transverse cross-section of the blade, the joint surface being defined by a multiplicity of straight lines in adjacent parallel planes normal to the longitudinal axis of the blade, each straight line being a tangent to the camber line in the plane containing said straight line at said one edge of the blade, the machine tool comprising a base, a contour master mounted on the base and having a continuous, non-planar guide surface, the guide surface also being defined by a multiplicity of straight lines in adjacent parallel planes and being congruent with the joint surface so that the planes containing the lines defining the guide surface are parallel to the planes containing the lines defining the joint surface, mounting means on the base for holding the skin adjacent to the master and in fixed relation thereto, a thrust member, means to import to the member traverse components of velocity in directions normal to said planes, means mounting the member for movement toward and away from the base in directions normal to said components of velocity, a tool-holder carried in pivotal mountings on the member for rocking movement about an axis parallel to said components of velocity, a cutting tool mounted in the tool-holder and extending over the edge of the skin when the latter is mounted on the base, and follower means operatively connected to the tool to engage the guide surface on the master, the follower means being maintained in engagement with the guide surface during operation of the tool whereby the tool is rocked and the thrust member is moved toward and away from the base as the member is traversed to cause the cutting tool to cut the joint surface on the skin.

6. A machine tool for producing a continuous, non-planar joint surface along one of the leading and trailing edges of a sheet metal skin of a twisted blade of aerofoil section having leading and trailing edges and a camber line joining the leading and trailing edges at each transverse cross-section of the blade, the joint surface being defined by a multiplicity of straight lines in adjacent parallel planes normal to the longitudinal axis of the blade, each straight line being a tangent to the camber line in the plane containing said straight line at said one edge of the blade, the machine tool comprising a base, a contour master mounted on the base and having a continuous, non-planar guide surface, the guide surface also being defined by a multiplicity of straight lines in adjacent parallel planes and being congruent with the joint surface so that the planes containing the lines defining the guide surface are parallel to the planes containing the lines defining the joint surface, a bed on the base for receiving the skin with said edge adjacent to the master, a block to overlie and co-operate with the bed, means releasably to secure the block to the bed with the skin clamped therebetween in fixed relation thereto, the block substantially overlying the skin except for the area to be cut, a thrust member, means to impart to the member traverse components of velocity in directions normal to said planes, means mounting the member for movement toward and away from the base in directions normal to said components of velocity, a tool-holder carried in pivotal mountings on the member for rocking movement about an axis parallel to said components of velocity, a cutting tool mounted in the tool-holder and extending over the edge of the skin when the latter is clamped in position on the bed and follower means operatively connected to the tool to engage the guide surface on the master, the follower means being maintained in engagement with the guide surface during operation of the tool whereby the tool is rocked and the thrust member is moved toward and away from the base as the member is traversed to cause the cutting tool to cut the joint surface on the skin.

References Cited in the file of this patent

UNITED STATES PATENTS

| | | |
|---|---|---|
| 2,534,091 | Zimmermann | Oct. 3, 1950 |
| 2,737,856 | Creek et al. | Mar. 13, 1956 |
| 2,741,164 | Smedley | Apr. 10, 1956 |
| 2,841,052 | Lucy | July 1, 1958 |